(12) United States Patent
Jones et al.

(10) Patent No.: US 10,552,491 B2
(45) Date of Patent: Feb. 4, 2020

(54) SYSTEMS, DEVICES, AND METHODS FOR COMPUTING GEOGRAPHICAL RELATIONSHIPS BETWEEN OBJECTS

(71) Applicant: Walmart Apollo, LLC, Bentonville, AR (US)

(72) Inventors: Nicholaus Adam Jones, Fayetteville, AR (US); Aaron James Vasgaard, Rogers, AR (US); Robert James Taylor, Rogers, AR (US); Matthew Allen Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 194 days.

(21) Appl. No.: 15/476,947

(22) Filed: Mar. 31, 2017

(65) Prior Publication Data

US 2017/0286450 A1    Oct. 5, 2017

Related U.S. Application Data

(60) Provisional application No. 62/317,074, filed on Apr. 1, 2016.

(51) Int. Cl.
*G06F 17/30* (2006.01)
*G06F 16/907* (2019.01)

(52) U.S. Cl.
CPC .................. *G06F 16/907* (2019.01)

(58) Field of Classification Search
CPC .......................... G06F 17/30997; G06F 16/907
See application file for complete search history.

(56) References Cited

U.S. PATENT DOCUMENTS

| | | | |
|---|---|---|---|
| 8,321,303 B1 | 11/2012 | Krishnamurthy et al. | |
| 8,820,481 B2 | 9/2014 | Brucia | |
| 2003/0177066 A1* | 9/2003 | Zhang | G06Q 30/02 |
| | | | 705/14.23 |
| 2006/0010027 A1 | 1/2006 | Redman | |

(Continued)

OTHER PUBLICATIONS

Nicasio, How to Encourage Impulse Buys in Your Store: A Deeper Look at Unplanned Purchases. retrieved online at: https://blog.vendhq.com/post/64901826173/encourage-impulse-buys-store-deeper-look-unplanned-purchases. 10 pages. Jun. 10, 2014.

*Primary Examiner* — Syed H Hasan
(74) *Attorney, Agent, or Firm* — McCarter & English, LLP; David R. Burns

(57) ABSTRACT

Methodologies, systems, and computer-readable media are provided for locating objects. A computational device generates a first set of statistical data indicative of a frequency at which machine readable features associated with a first set of objects and machine readable features associated with a second set of objects are read within each of a plurality of object groups. The computational device also retrieves a second set of statistical data indicative of a historical frequency at which past groups of objects included machine readable features associated with the first set of objects and machine readable features associated with the second set of objects during a previous time interval. Based on a comparison between the first set of statistical data and the second set of statistical data, the computational deice computes a geographical relationship between the first set of objects and a portion of the objects from the second set of objects.

14 Claims, 5 Drawing Sheets

(56) References Cited

U.S. PATENT DOCUMENTS

| | | | |
|---|---|---|---|
| 2007/0007337 A1* | 1/2007 | Clark | G06Q 10/087 |
| | | | 235/383 |
| 2007/0016494 A1 | 1/2007 | Brown et al. | |
| 2008/0154691 A1* | 6/2008 | Wellman | G05D 1/0282 |
| | | | 705/7.26 |
| 2008/0294487 A1 | 11/2008 | Nasser | |
| 2011/0106624 A1* | 5/2011 | Bonner | G06Q 30/0261 |
| | | | 705/14.58 |
| 2011/0309044 A1* | 12/2011 | Morrow | A47F 5/005 |
| | | | 211/59.2 |
| 2014/0207619 A1* | 7/2014 | Ishebabi | G06Q 30/0623 |
| | | | 705/26.61 |
| 2014/0244207 A1* | 8/2014 | Hicks | G01C 3/00 |
| | | | 702/150 |
| 2014/0279294 A1* | 9/2014 | Field-Darragh | G06Q 10/087 |
| | | | 705/28 |
| 2014/0320265 A1* | 10/2014 | Jones | G06Q 10/0833 |
| | | | 340/10.1 |
| 2015/0039461 A1 | 2/2015 | Gadre et al. | |
| 2015/0081088 A1* | 3/2015 | Lyon | G06Q 10/0875 |
| | | | 700/216 |
| 2015/0178671 A1 | 6/2015 | Jones et al. | |
| 2016/0104175 A1* | 4/2016 | Fanourgiakis | G06Q 30/0201 |
| | | | 705/7.29 |
| 2016/0247219 A1* | 8/2016 | Sorensen | G06Q 30/0641 |
| 2018/0005177 A1* | 1/2018 | Wilkinson | G06Q 10/083 |
| 2018/0053236 A1* | 2/2018 | Fransen | G06Q 30/0631 |
| 2018/0165629 A1* | 6/2018 | Okamoto | G06Q 10/00 |

* cited by examiner

SYSTEMS, DEVICES, AND METHODS FOR COMPUTING GEOGRAPHICAL RELATIONSHIPS BETWEEN OBJECTS

RELATED APPLICATIONS

This application claims priority to U.S. Provisional Patent Application Ser. No. 62/317,074 entitled "SYSTEMS, DEVICES, AND METHODS FOR COMPUTING GEOGRAPHICAL RELATIONSHIPS BETWEEN OBJECTS," filed on Apr. 1, 2016, the contents of which is hereby incorporated by reference in its entirety.

BACKGROUND OF THE TECHNOLOGY

Physical objects can be associated with machine readable identifiers that can be read by an optical reader. In some instances, a computing terminal can record and store data relating to the time and frequency at which machine readable identifiers are read.

SUMMARY

In accordance with embodiments of the present disclosure, a system for locating objects is disclosed. The system includes a computational device in communication with a database and an optical reader. The computational device can be configured to receive, from the optical reader, machine readable features associated with a plurality of objects collected from a plurality of locations. The plurality of objects are associated with a plurality of object groups, and each of the plurality of object groups includes a subset of the plurality of objects.

The computational device can also be configured to generate a first set of statistical data indicative of a frequency at which machine readable features associated with a first set of objects and machine readable features associated with a second set of objects are read within each of a plurality of object groups. Each object from the first set of objects originates from a known first geographical location.

The computational device can also be configured to retrieve from the database a second set of statistical data indicative of a historical frequency at which past groups of objects included machine readable features associated with the first set of objects and machine readable features associated with the second set of objects during a previous time interval. The computational device is also configured to compute, based on a comparison between the first set of statistical data and the second set of statistical data, a geographical relationship between the objects from the first set of objects and a portion of the objects from the second set of objects. In some embodiments, each object from the second set of objects originates from any one of a specified set of geographical locations. In some embodiments, one of the specified set of geographical locations includes a second geographical location proximal to the known first geographical location.

In some embodiments, computing the geographical relationship between the objects from the first set of objects and a portion of the objects from the second set of objects includes determining whether the portion of the objects from the second set of objects originated from the second geographical location proximal to the known first geographical location. In some embodiments, an increased frequency from the second set of statistical data to the first set of statistical data indicates that a portion of the objects from the second set of objects has been relocated to the second geographical location proximal to the known first geographical location. In some embodiments, substantially no change between the second set of statistical data and the first set of statistical data indicates that objects from the second set of objects have not been relocated to the second geographical location proximal to the known first geographical location. In some embodiments, the system also includes an electronic device configured to read machine readable features associated with each of a plurality of objects collected from a plurality of geographical locations, the plurality of objects being read in groups and including at least one object from the first set of objects and at least one object from the second set of objects.

Additional combinations and/or permutations of the above examples are envisioned as being within the scope of the present disclosure. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

The foregoing and other features and advantages provided by the present disclosure will be more fully understood from the following description of exemplary embodiments when read together with the accompanying drawings, in which.

DETAILED DESCRIPTION

Figure 1:
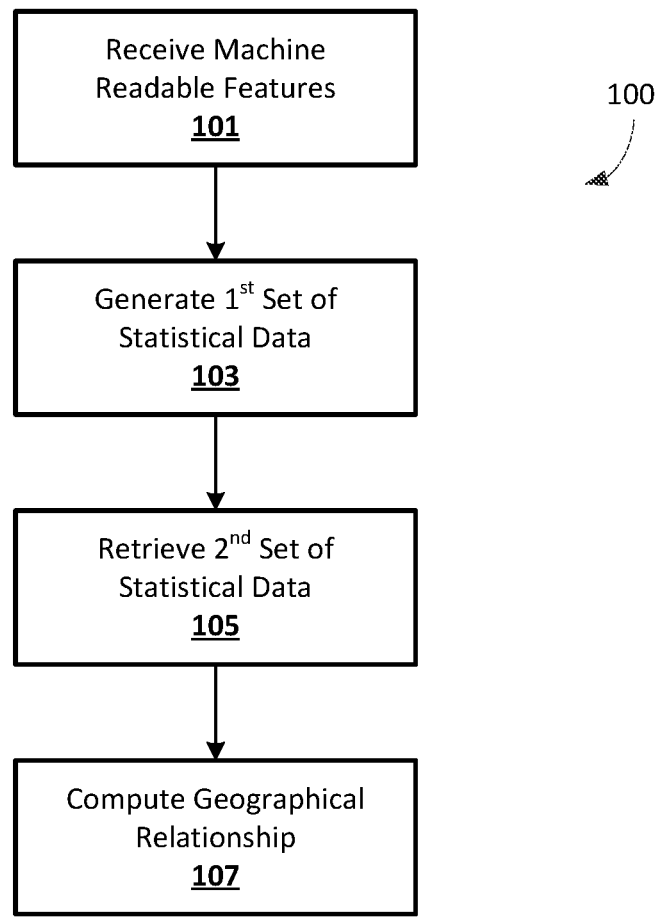
FIG. 1 is a flowchart illustrating an exemplary method of locating objects, according to embodiments of the present disclosure.

Following below are more detailed descriptions of various concepts related to, and embodiments of, inventive methods, apparatus, and systems for locating objects. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means includes but is not limited to, the term "including" means including but not limited to. The term "based on" means based at least in part on.

Example methodologies, systems, apparatus, and non-transitory computer-readable media are described herein to facilitate locating objects and computing a geographical relationship between objects. Encoded machine readable features, such as barcodes, QR codes, RFID tags associated with collections of objects brought to a local terminal can be read in a plurality of object groups based on the collections. For example, a first individual can collect a first collection of objects and can bring the first collection of objects to the local terminal and a second individual can collect a second collection of objects and can bring the second collection of objects to the local terminal. The first collection of objects can correspond to a first group of objects having machine-readable features that are read at the local terminal and the second collection of objects can correspond to a second group of objects having machine-readable features that can be read by the local terminal or another local terminal. The objects can originate from a number of different geographical locations within a facility and can be categorized into various sets of objects based on object characteristics. However, determining the locations from which the collected objects were removed and/or geographical relationships between locations from which the collected objects were removed poses a number of non-trivial challenges.

In accordance with embodiments of the present disclosure, a system for computing a geographical relationship between objects is disclosed. As discussed above, objects may be gathered from different geographical locations within a facility and brought to the location of a computational device capable of reading machine readable features associated with those objects. Examples of encoded machine readable features can include, for example, a barcode, QR code, or RFID tag, and the computational device can include an optical reader such as a barcode reader, QR code reader, or any other suitable user-machine interface capable of reading encoded machine readable features. In exemplary embodiments, the objects can be classified according to various characteristics into a number of different sets of objects, and the machine readable features associated with objects from any one of the different sets of objects can be read in groups of varying sizes. By recording and analyzing statistical data relating to the frequency at which machine readable features associated with objects from different sets of objects are read within groups of objects, the geographical relationship between objects can be estimated.

A first set of statistical data indicative of the frequency at which machine readable machine readable features associated with a first set of objects and machine readable features associated with a second set of objects are read within each object group can be recorded and stored in a database. This first set of statistical data can be compared against a second set of statistical data indicative of a historical frequency at which past groups of objects included machine readable features associated with the first set of objects and machine readable features associated with the second set of objects during a previous time interval. The location from which the first set of objects are collected can be known, while the location from which at least a portion of the second set of objects are collected can be unknown. Based on the comparison between the first set of statistical data and the second set of statistical data, a computational device can compute a geographical relationship between the objects from the first set of objects and a portion of the objects from the second set of objects. For example, when each object from the second set of objects originates from one of a specified set of geographical locations, a change in frequency between the first set of statistical data and the second set of statistical data can indicate that the location of origin of a portion of the objects from the second set of objects has changed. In exemplary embodiments, an increased frequency from the second set of statistical data to the first set of statistical data indicates that a portion of the objects from the second set of objects was relocated to a location of origin proximal to the known first geographical location. Similarly, in exemplary embodiments, no change in frequency from the second set of statistical data to the first set of statistical data indicates that no portion of the objects from the second set of objects was relocated to a different location of origin.

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

FIG. 1 is a flowchart illustrating an exemplary method 100 for locating objects. It will be appreciated that the method is programmatically performed by one or more computer-executable processes executing on, or in communication with one or more servers described further below. In step 101, a computational device that is in communication with a database and an optical reader receives machine readable features associated with objects collected/removed from locations from the optical reader. The objects are associated with object groups, and each of the object groups can include a subset of the objects.

In step 103, the computational device generates a first set of statistical data. The first set of statistical data is indicative of a frequency at which machine readable features associated with a first set of objects and machine readable features associated with a second set of objects are read within each object group. Each object from the first set of objects can originate from a known first geographical location. In exemplary embodiments, each object from the second set of objects can originate from one of a specified set of geographical locations. One of the specified set of geographical locations can include a geographical location proximal to the known first geographical location.

In step 105, the computational device retrieves a second set of statistical data from the database. The second set of statistical data is indicative of a historical frequency at which past groups of objects included machine readable features associated with the first set of objects and machine readable features associated with the second set of objects during time interval previous to when the first set of statistical data is generated. In exemplary embodiments, the previous time interval can be the previous week, previous month, previous year, or another predetermined time interval.

In step 107, a geographical relationship between the objects from the first set of objects and a portion of the objects from the second set of objects is computed, via a geographical relationship module, based on the comparison between the first set of statistical data and the second set of statistical data. As discussed above, the second set of statistical data corresponds to historical data gathered over a previous time interval, whereas the first set of statistical data can correspond to more recently gathered data. A comparison between the first set of statistical data and the second set of statistical data can be indicative of recent changes in the geographical relationship between objects from the first set of objects and objects from the second set of objects. In exemplary embodiments, the computational device can determine whether a portion of the objects from the second set of objects originated from a geographical location proximal to the known first geographical location based on the comparison between the first set of statistical data and the second set of statistical data. For example, if there is substantially no change in frequency between the first set of statistical data and the second set of statistical data, the objects from the second set of objects and the objects from the first set of objects have the same geographical relationship as they did during the previous time interval. However, if there is a change in frequency between the first set of statistical data and the second set of statistical data, the geographical relationship module can compute that at least a portion of the objects from the second set of objects originated from a different location of origin than during the previous time interval.

Figure 2:
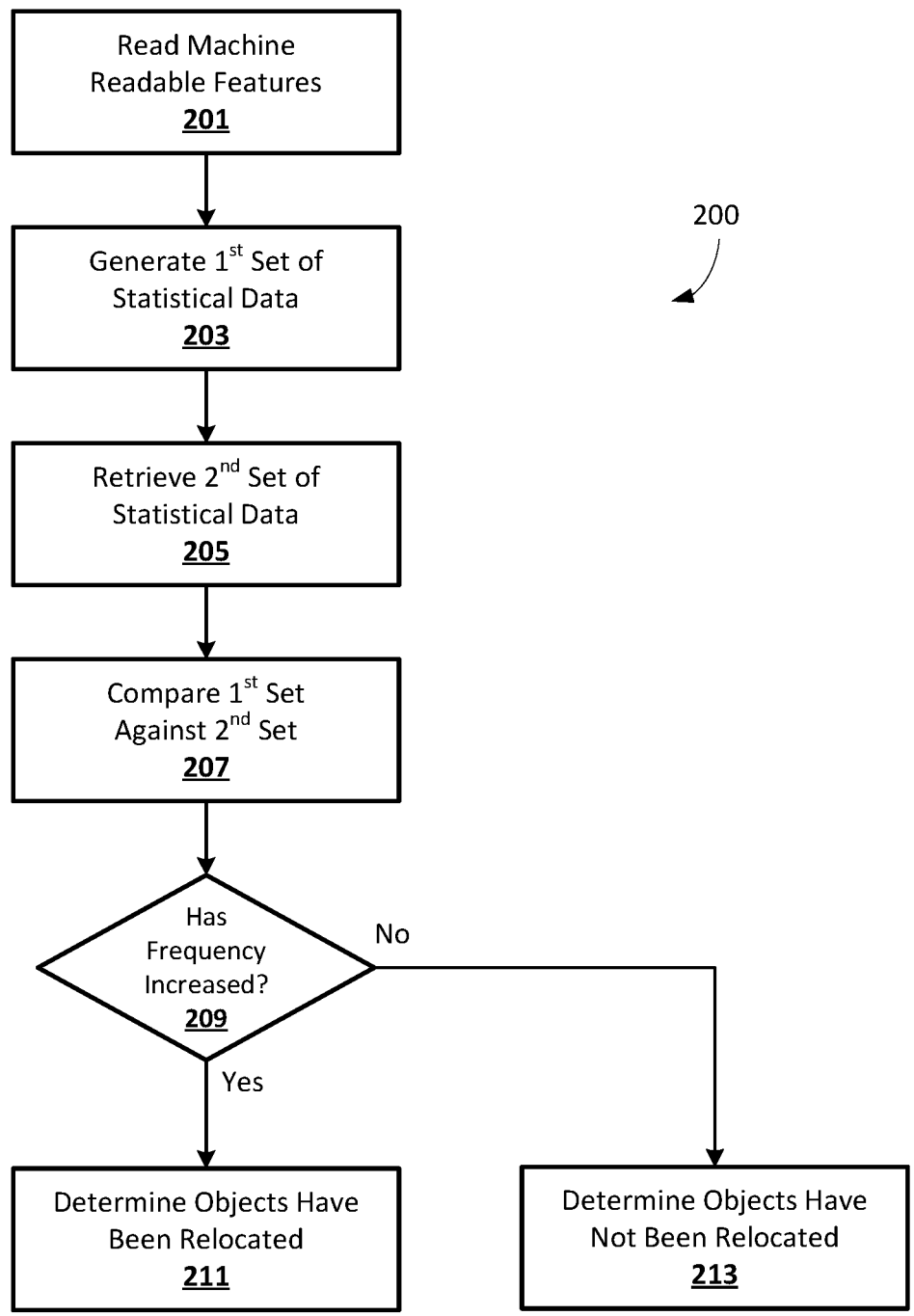
FIG. 2 is a flowchart illustrating another exemplary method of locating objects, according to embodiments of the present disclosure.

FIG. 2 is a flowchart illustrating another exemplary method 200 for locating objects. It will be appreciated that the method is programmatically performed by one or more computer-executable processes executing on, or in communication with one or more servers described further below. In step 201, machine readable features associated with each of a plurality of objects are read by an electronic device capable of reading machine readable features. In exemplary embodiments, each of the plurality of objects can be collected/removed from a plurality of geographical locations, and the plurality of objects are read in groups including at least one object from a first set of objects and at least one object from a second set of objects.

In step 203, a computational device that is in communication with a database generates a first set of statistical data. The first set of statistical data is indicative of a frequency at which machine readable features associated with the first set of objects and machine readable features associated with the second set of objects are read within each object group. Each object from the first set of objects can originate from a known first geographical location. In exemplary embodiments, each object from the second set of objects can originate from one of a specified set of geographical locations. One of the specified set of geographical locations can include a geographical location proximal to the known first geographical location.

In step 205, the computational device retrieves a second set of statistical data from the database. The second set of statistical data is indicative of a historical frequency at which past groups of objects included machine readable features associated with the first set of objects and machine readable features associated with the second set of objects during time interval previous to when the first set of statistical data is generated. In exemplary embodiments, the previous time interval can be the previous week, previous month, previous year, or another predetermined time interval.

In step 207, the first set of statistical data is compared against the second set of statistical data via a data comparison module. As discussed above, the second set of statistical data corresponds to historical data gathered over a previous time interval, whereas the first set of statistical data can correspond to more recently gathered data. As such, a comparison between the first set of statistical data and the second set of statistical data can indicate recent changes in the geographical relationship between objects from the first set of objects and objects from the second set of objects. In exemplary embodiments, a comparison between the first set of statistical data and the second set of statistical data can be indicative of whether a portion of the objects from the second set of objects originated from a geographical location proximal to the known first geographical location.

In step 209, the data comparison module determines whether there is any increase in frequency from the second set of statistical data to the first set of statistical data. If there is an increase in frequency from the second set of statistical data to the first set of statistical data, the computational device determines in step 211 that at least a portion of the second set of objects has been relocated. Specifically, an increased frequency from the second set of statistical data to the first set of statistical data indicates that a portion of the objects from the second set of objects has been relocated to a geographical location proximal to the known first geographical location. In some embodiments, a threshold change in frequency can be established such that increases in the frequency that exceed the threshold are indicative of a relocation of the objects from the second set of object to a geographical location proximal to the known first location.

If there is substantially no increase in frequency from the second set of statistical data to the first set of statistical data (e.g., the increase does not exceed an established threshold), the data comparison module determines in step 213 that the objects from the second set of objects have not been relocated. In such an embodiment, it can be determined that the objects from the first set of objects and the objects from the second set of objects have the same geographical relationship as during the previous time interval.

Figure 3:
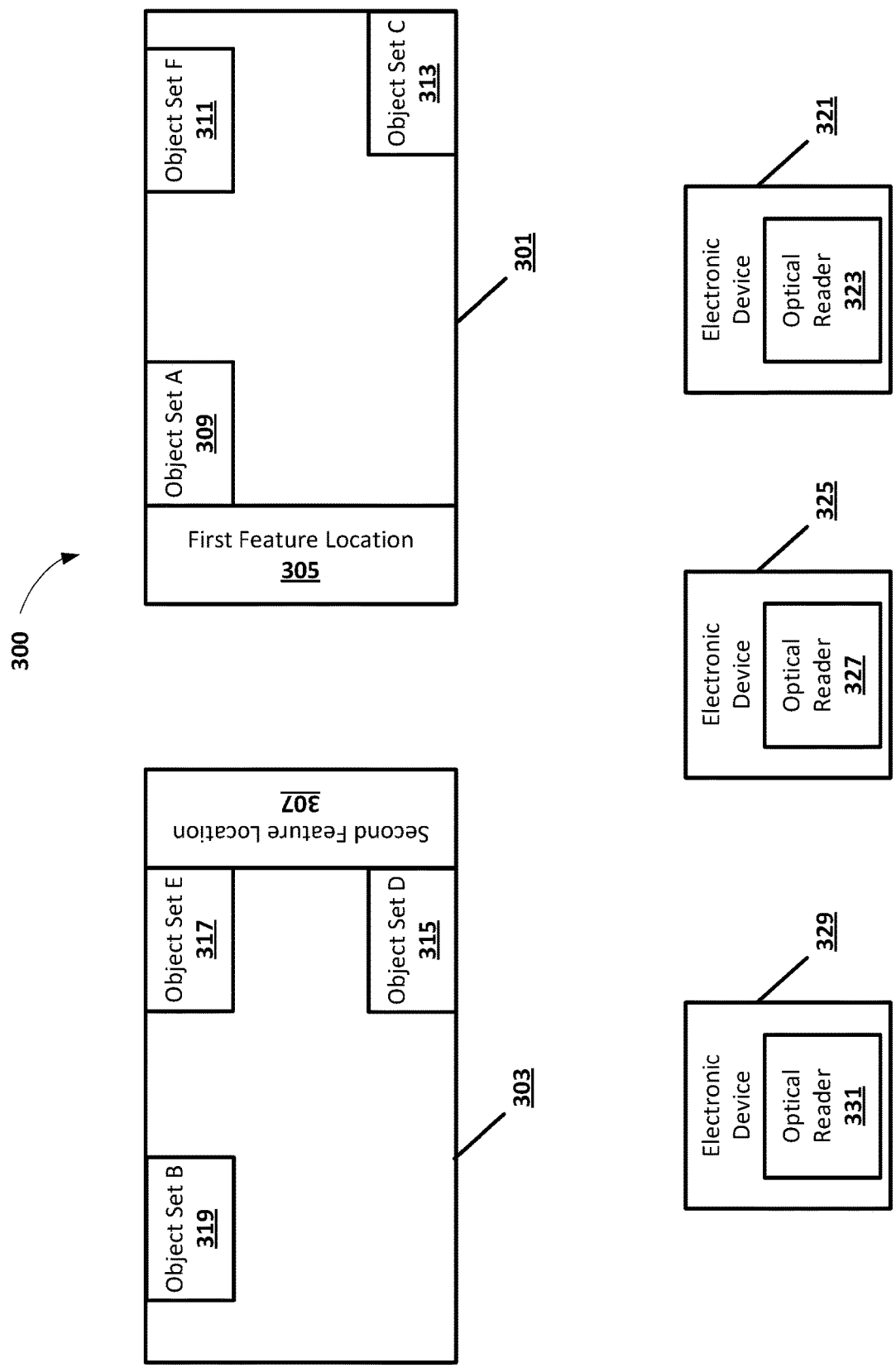
FIG. 3 shows an example map displaying geographical locations of various objects, according to embodiments of the present disclosure.

FIG. 3 shows an example map 300 displaying geographical locations of various objects within a facility, according to embodiments of the present disclosure. In this exemplary embodiment, a first structure 301 and a second structure 303 can be used to store and display a plurality of objects within a facility. For example objects can be categorized into various sets, including object sets A, B, C, D, E, and F. In this example, objects from object set A are located at location 309 on structure 301, objects from object set B are located on structure 303 at location 319, objects from object set C are located at location 313, objects from object set D are located at location 315, objects from object set E are located at location 317, and objects from object set F are located at location 311. In exemplary embodiments, the first structure 301 includes a first feature location 305, and the second structure 303 includes a second feature location 307. The first and second feature locations 305 and 307 can include objects from any one of the object sets A, B, C, D, E, or F.

Map 300 also shows electronic devices 321, 325, and 329, each of which includes an optical reader 323, 327, and 331, respectively, configured to read machine readable features associated with each of the objects from object sets A, B, C, D, E, and F. Objects from the various object sets can be gathered by one or more individuals into a plurality of object groups as the one or more individuals travel through the facility (e.g., removed from their stored/displayed locations). For example, a first group of objects can correspond to objects collected by a first individual and a second group of objects can correspond to objects collected by a second individual. The gathered objects are brought to the electronic devices 321, 325, or 329 in the groups, and the optical readers 323, 327, or 331 read the machine readable features associated with each object in the groups. For example, the optical reader 323 of a first one of the electronic devices 321 reads machine readable features of a first group of objects and the optical reader 327 of a different one of the electronic devices 325 reads machine readable features of a second group of objects. The electronic devices 321, 325, and 329 can record and store, in a database, a first set of statistical data indicative of a frequency at which machine readable features associated with different sets of objects are read within each of the object groups. For example, the electronic devices 321, 325, and 329 may record statistical data indicating the frequency at which machine readable features associated with objects from object set A and object set B are read in a single object group. Similarly, the electronic devices 321, 325, and 329 can record the frequency at which machine readable features associated with objects from any combination of object sets are read within a single object group.

Figure 4:
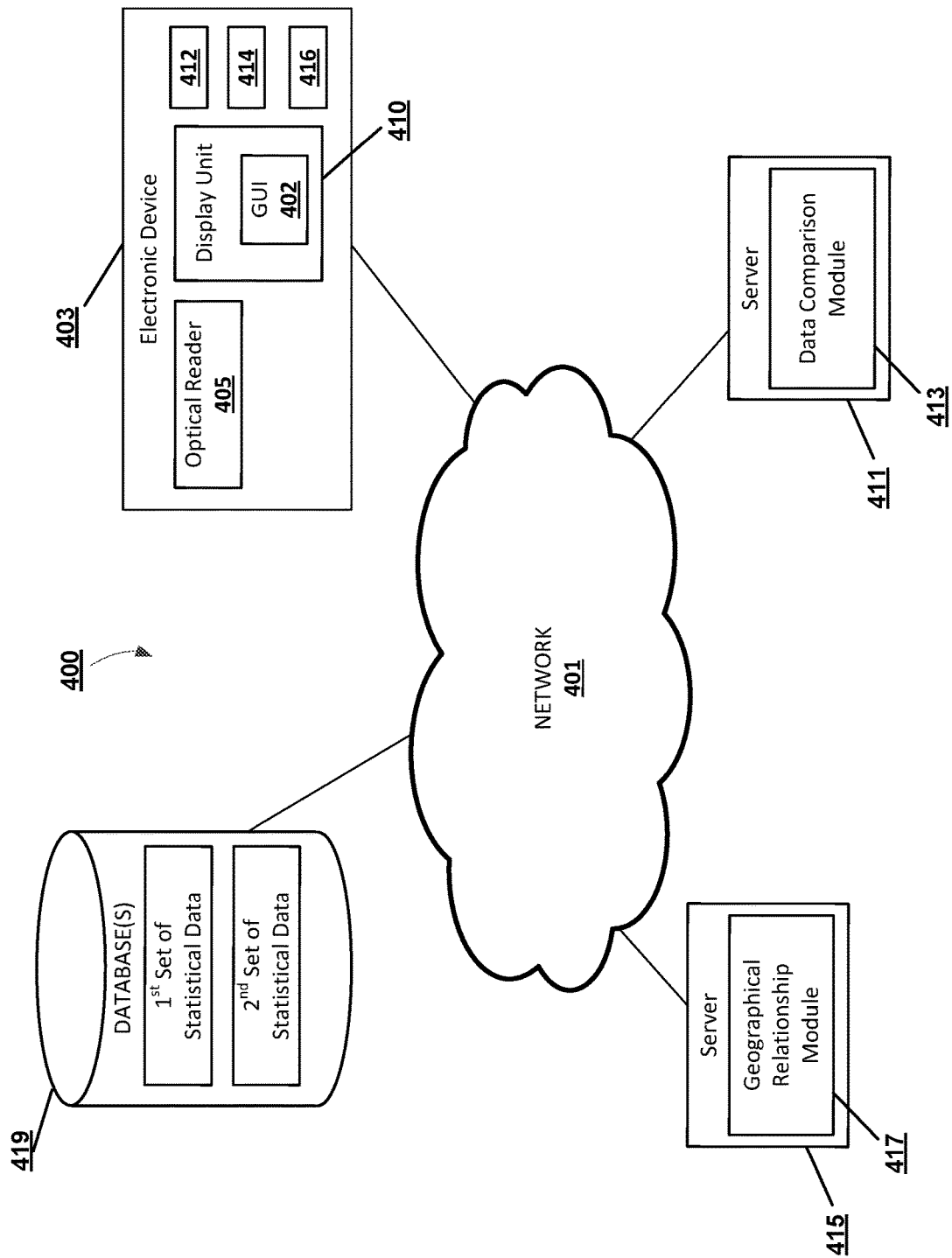
FIG. 4 is a diagram of an exemplary network environment suitable for a distributed implementation of an exemplary embodiment of the present disclosure.

A computational device can retrieve a second set of statistical data from a database, as described herein. Examples of computations devices are illustrated in FIGS. 3 and 4. This second set of statistical data is indicative of a historical frequency at which past groups of objects included machine readable features associated with different combinations of objects from the object sets during time interval previous to when the first set of statistical data is generated. For example, the second set of statistical data can include data gathered by the electronic devices 321, 325, and 329 that is indicative of how often machine readable features associated with objects from object sets A and B were read in a single object group over the past month or year.

Upon reading the machine readable features associated with the objects in an object group, the computational device can compare the two sets of statistical data to determine the geographical relationship between the objects in the object group. In an exemplary embodiment, the optical readers 323, 327, and 331 associated with the electronic devices 321, 325, and 329 reads objects from object groups, and in fifteen percent (15%) of those object groups, machine readable features associated with objects from object set A and machine readable features associated with objects from object set B are read. If, for example, the system knows that the objects from object set A are not located at the feature locations 305 and 307, the system is still not certain that the objects from object set B originated from location 319 because there is a possibility that the objects from object set B originated from the first feature location 305 or the second feature location 307. The computational device can retrieve the second set of statistical data in order to discover the historical frequency at which machine readable features associated with objects from object set A and object set B were read in a single object group during a previous time interval. In exemplary embodiments, during the previous time interval none of the objects from object set A or object set B were located at either of the feature locations 305 or 307. If the second set of statistical data indicates that historically, only ten percent (10%) of the object groups included objects from object set A and object set B, the computational device can determine that a portion of the objects from object set B are located at feature location 305, which is proximal to location 309 associated with the objects from object set A. This determination can be made because the objects within each of the plurality of object groups are gathered by one or more individuals traveling through the facility, and if objects from different object sets are located closer to one another, there is an increased probability that those objects will be gathered in the same group.

In another example embodiment, a portion of the objects from object set F are supposed to be relocated from location 311 to the second feature location 307 proximal to the objects from object set D at location 315. If a portion of the objects from object set F are properly relocated to the second feature location 307, there should be an increase in the frequency at which objects from object set F and objects from object set D are found in the same object group. The electronic device 321 can gather statistical data indicative of the frequency at which machine readable features associated with objects from object set F and object set D are read in a single object group and compare that data against a second set of statistical data indicative of a historical frequency at which machine readable features associated with objects from object set F and object set D were read in the same object group during a previous time period. If there is no increase in frequency, the system can determine that the objects from object set F have not be relocated to the second feature location 307. If, however, there is an increase in the frequency at which objects from object set F and object set D appear in the same object group, the system can determine that a portion of the objects from object set F have been relocated to the second feature location 307 proximal to location 315.

FIG. 4 illustrates a network diagram depicting a system 400 suitable for a distributed implementation of exemplary embodiments. The system 400 can include a network 401, a electronic device 403, two or more computational devices or servers 411 and 415, and a database 419. As will be appreciated, various distributed or centralized configurations may be implemented, and in some embodiments a single server can be used. In exemplary embodiments, the server 411 can store and execute a data comparison module 413 and server 415 can store and execute a geographical relationship module 417, each of which can implement one or more of the processes described herein with reference to FIGS. 1-2, or portions thereof. The database 419 can store the first set of statistical data and the second set of statistical data, in exemplary embodiments.

In exemplary embodiments, the electronic device 403 may include a display unit 410, which can display a GUI 402 to a user of the device. In some embodiments, the electronic device 403 also includes an optical reader 405 for reading machine readable features associated with objects, as described above. The electronic device 403 may include, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. The electronic device 403 may include some or all components described in relation to computing device 500 shown in FIG. 5.

As a non-limiting example application, the electronic device 403, can be part of a store infrastructure and aid in performing various transactions related to sales and other aspects of a store. Being part of a store's infrastructure, the electronic device 403 may be fixedly installed within the store or may be fixedly installed or operational outside of the store. In some embodiments, the electronic device 403 may be a mobile device that can be used within the store, and is not physically installed or attached to one particular location within the store. The electronic device 403 may also include various external or peripheral devices to aid in performing sales transactions and other duties. Examples of peripheral devices include, but are not limited to, barcode scanners, cash drawers, monitors, touch-screen monitors, clicking devices (e.g., mouse), input devices (e.g., keyboard), receipt printers, coupon printers, payment terminals, and the like.

Examples of payment terminals include, but are not limited to, card readers, pin pads, signature pads, signature pens, Square™ registers, LevelUp™ platform, cash or change deposit devices, cash or change dispensing devices, coupon accepting devices, and the like. The electronic device 403 may connect to network 401 via a wired or wireless connection. The electronic device 403 may include one or more applications such as, but not limited to, a web browser, a sales transaction application, an object reader application, and the like.

In exemplary embodiments, the servers 411 and 415, database 419, and electronic device 403 may be in communication with each other via a communication network 401. The communication network 401 may include, but is not limited to, the Internet, an intranet, a LAN (Local Area Network), a WAN (Wide Area Network), a MAN (Metropolitan Area Network), a wireless network, an optical network, and the like. In one embodiment, the servers 411 and 415 and the electronic device 403 can transmit instructions to each other over the communication network 401. In exemplary embodiments, the first set of statistical data and the second set of statistical data can be stored at database 419 and received at the servers 411 and 415 in response to a service performed by a database retrieval application.

Figure 5:
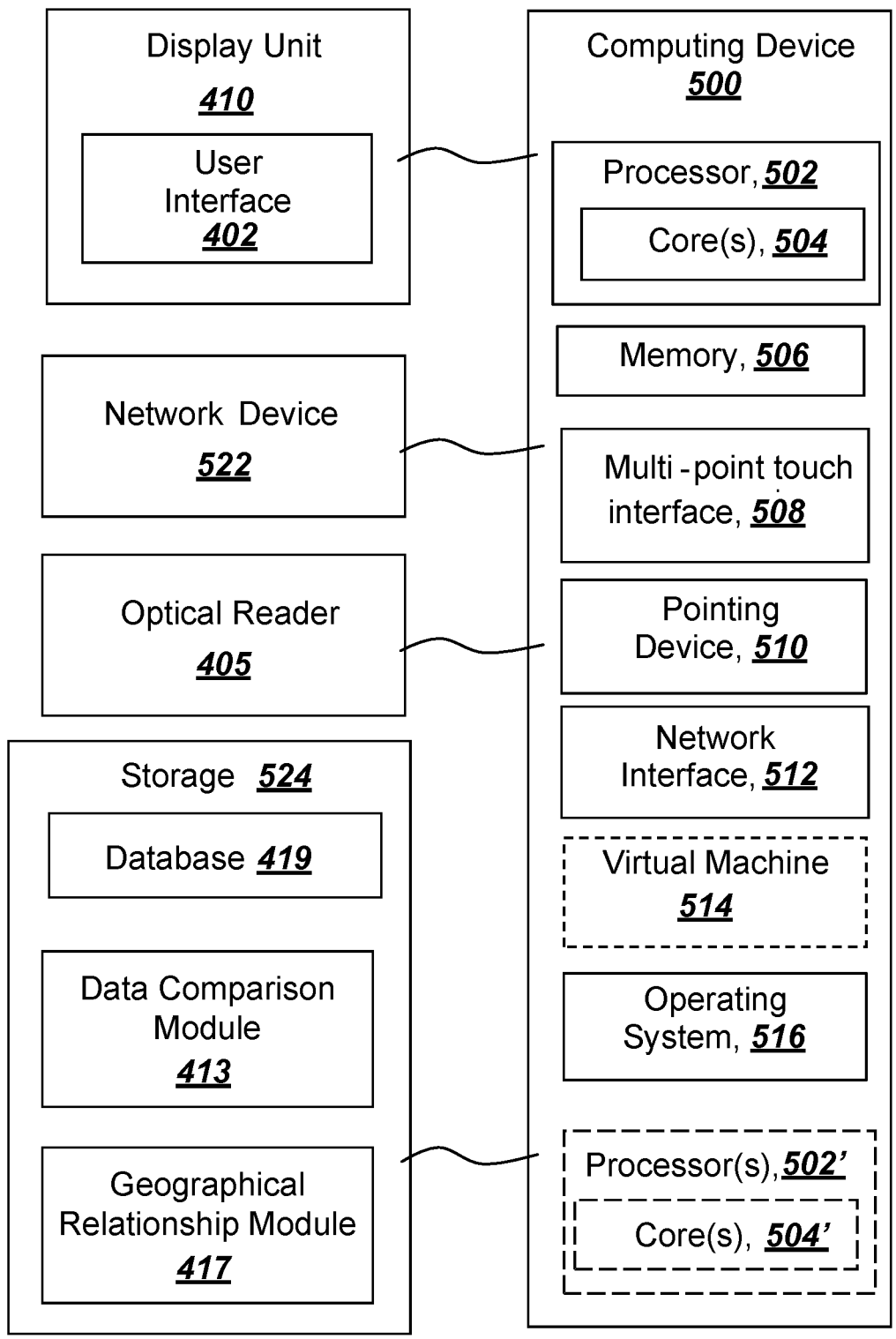
FIG. 5 is a block diagram of an exemplary computing device that can be used to perform exemplary processes in accordance with an exemplary embodiment of the present disclosure.

FIG. 5 is a block diagram of an exemplary computing device 500 that can be used in the performance of any of the example methods according to the principles described herein. The computing device 500 includes one or more non-transitory computer-readable media for storing one or more computer-executable instructions (such as but not limited to software or firmware) for implementing any example method according to the principles described herein. The non-transitory computer-readable media can include, but are not limited to, one or more types of hardware memory, non-transitory tangible media (for example, one or more magnetic storage disks, one or more optical disks, one or more USB flashdrives), and the like.

For example, memory 506 included in the computing device 500 can store computer-readable and computer-executable instructions or software for implementing exemplary embodiments and programmed to perform processes described herein, such as, for example, the processes described above in reference to FIGS. 1-2. The computing device 500 also includes processor 502 and associated core 504, and optionally, one or more additional processor(s) 502' and associated core(s) 504' (for example, in the case of computer systems having multiple processors/cores), for executing computer-readable and computer-executable instructions or software stored in the memory 506 and other programs for controlling system hardware. Processor 502 and processor(s) 502' can each be a single core processor or multiple core (504 and 504') processor.

Virtualization can be employed in the computing device 500 so that infrastructure and resources in the computing device can be shared dynamically. A virtual machine 514 can be provided to handle a process running on multiple processors so that the process appears to be using only one computing resource rather than multiple computing resources. Multiple virtual machines can also be used with one processor.

Memory 506 can be non-transitory computer-readable media including a computer system memory or random access memory, such as DRAM, SRAM, EDO RAM, and the like. Memory 506 can include other types of memory as well, or combinations thereof.

A user can interact with the computing device 500 through a display unit 410, such as a touch screen display or computer monitor, which can display one or more user interfaces 402 that can be provided in accordance with exemplary embodiments. The computing device 500 can include or be in communication with an optical reader 405, for reading machine readable features on objects, as described above. The computing device 500 can also include other I/O devices for receiving input from a user, for example, a keyboard or any suitable multi-point touch interface 508, a pointing device 510 (e.g., a pen, stylus, mouse, or trackpad). The keyboard 508 and the pointing device 510 can be coupled to the visual display device 410. The computing device 500 can include other suitable conventional I/O peripherals.

The computing device 500 can also include one or more storage devices 524, such as a hard-drive, CD-ROM, or other non-transitory computer readable media, for storing data and computer-readable instructions and/or software, such as a data comparison module 413 and a geographical relationship module 417 that can implement exemplary embodiments of the methods and systems as taught herein, or portions thereof. Exemplary storage device 524 can also store one or more databases 419 for storing any suitable information required to implement exemplary embodiments. The databases can be updated by a user or automatically at any suitable time to add, delete, or update one or more items in the databases. Exemplary storage device 524 can store one or more databases 419 for storing the first set of statistical data and the second set of statistical data described above, and any other data/information used to implement exemplary embodiments of the systems and methods described herein.

The computing device 500 can include a network interface 512 configured to interface via one or more network devices 522 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 512 can include a built-in network adapter, network interface card, PCMCIA network card, card bus network adapter, wireless network adapter, USB network adapter, modem or any other device suitable for interfacing the computing device 500 to any type of network capable of communication and performing the operations described herein.

Moreover, the computing device 500 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 500 can run any operating system 516, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 516 can be run in native mode or emulated mode. In an exemplary embodiment, the operating system 516 can be run on one or more cloud machine instances.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps can be replaced with a single element, component or step Likewise, a single element, component or step can be replaced with a plurality of elements, components or steps that serve the same purpose. Moreover, while example embodiments have been shown and described with references to particular embodiments thereof, those of ordinary skill in the art will understand that various substitutions and alterations in form and detail can be made therein without departing from the scope of the disclosure. Further still, other aspects, functions and advantages are also within the scope of the disclosure.

Example flowcharts are provided herein for illustrative purposes and are non-limiting examples of methods. One of ordinary skill in the art will recognize that example methods can include more or fewer steps than those illustrated in the example flowcharts, and that the steps in the example flowcharts can be performed in a different order than the order shown in the illustrative flowcharts.

What is claimed is:

1. A system for locating objects, the system comprising:
   a computational device in communication with a database and an optical reader; the computational device configured to:
   receive, from the optical reader, machine readable features associated with a plurality of objects collected from a plurality of locations, the plurality of objects being associated with a plurality of object groups, each of the plurality of object groups including a subset of the plurality of objects;
   generate a first set of statistical data indicative of a frequency at which machine readable features associated with a first set of objects and machine readable features associated with a second set of objects are read within each of a plurality of object groups, each object from the first set of objects originating from a known first geographical location and each object from the second set of objects originating from an unknown second geographical location;
   retrieve from the database a second set of statistical data indicative of a historical frequency at which past groups of objects included machine readable features associated with the first set of objects and machine readable features associated with the second set of objects during a previous time interval;
   compute, based on a comparison between the first set of statistical data and the second set of statistical data, a geographical relationship between the objects from the first set of objects and a portion of the objects from the second set of objects,
   wherein an increased frequency from the second set of statistical data to the first set of statistical data indicates that a portion of the objects from the second set of objects has been relocated proximal to the known first geographical location.

2. The system of claim 1, wherein each object from the second set of objects originates from any one of a specified set of geographical locations.

3. The system of claim 1, wherein computing the geographical relationship between the objects from the first set of objects and a portion of the objects from the second set of objects includes determining whether the portion of the objects from the second set of objects originated from the second geographical location proximal to the known first geographical location.

4. The system of claim 1, wherein substantially no change between the second set of statistical data and the first set of statistical data indicates that objects from the second set of objects have not been relocated to the second geographical location proximal to the known first geographical location.

5. The system of claim 1, further comprising an electronic device configured to read machine readable features associated with each of a plurality of objects collected from a plurality of geographical locations, the plurality of objects being read in groups and including at least one object from the first set of objects and at least one object from the second set of objects.

6. A method for locating objects comprising:
   receiving, from an optical reader, machine readable features associated with a plurality of objects collected from a plurality of locations, the plurality of objects being associated with a plurality of object groups, each of the plurality of object groups including a subset of the plurality of objects;
   generating, via a computational device, a first set of statistical data indicative of a frequency at which machine readable features associated with a first set of objects and machine readable features associated with a second set of objects are read within each of a plurality of object groups, each object from the first set of objects originating from a known first geographical location, and each object from the second set of objects originating from an unknown second geographical location;
   retrieving from the database, via the computational device, a second set of statistical data indicative of a historical frequency at which past groups of objects included machine readable features associated with the first set of objects and machine readable features associated with the second set of objects during a previous time interval; and
   computing, via the computational device, a geographical relationship between the objects from the first set of objects and a portion of the objects from the second set of objects based on a comparison between the first set of statistical data and the second set of statistical data,
   wherein an increased frequency from the second set of statistical data to the first set of statistical data indicates that a portion of the objects from the second set of objects has been relocated proximal to the known first geographical location.

7. The method of claim 6, wherein each object from the second set of objects originates from any one of a specified set of geographical locations.

8. The method of claim 6, wherein computing the geographical relationship between the objects from the first set of objects and a portion of the objects from the second set of objects includes determining whether the portion of the objects from the second set of objects originated from the second geographical location proximal to the known first geographical location.

9. The method of claim 6, wherein substantially no change between the second set of statistical data and the first set of statistical data indicates that objects from the second set of objects have not been relocated to the second geographical location proximal to the known first geographical location.

10. The method of claim 6, further comprising reading, via an electronic device, machine readable features associated with each of a plurality of objects collected from a plurality of geographical locations, the plurality of objects being read in groups and including at least one object from the first set of objects and at least one object from the second set of objects.

11. A non-transitory machine readable medium storing instructions executable by a processing device, wherein execution of the instructions causes the processing device to implement a method for locating objects, the method comprising:

receiving, from an optical reader, machine readable features associated with a plurality of objects collected from a plurality of locations, the plurality of objects being associated with a plurality of object groups, each of the plurality of object groups including a subset of the plurality of objects;

generating a first set of statistical data indicative of a frequency at which machine readable features associated with a first set of objects and machine readable features associated with a second set of objects are read within each of a plurality of object groups, each object from the first set of objects originating from a known first geographical location and each object from the second set of objects originating from an unknown second geographical location;

retrieving from the database a second set of statistical data indicative of a historical frequency at which past groups of objects included machine readable features associated with the first set of objects and machine readable features associated with the second set of objects during a previous time interval; and computing a geographical relationship between the objects from the first set of objects and a portion of the objects from the second set of objects based on a comparison between the first set of statistical data and the second set of statistical data, wherein an increased frequency from the second set of statistical data to the first set of statistical data indicates that a portion of the objects from the second set of objects has been relocated proximal to the known first geographical location.

12. The non-transitory machine readable medium of claim 11, wherein each object from the second set of objects originates from any one of a specified set of geographical locations.

13. The non-transitory machine readable medium of claim 11, wherein computing the geographical relationship between the objects from the first set of objects and a portion of the objects from the second set of objects includes determining whether the portion of the objects from the second set of objects originated from the second geographical location proximal to the known first geographical location.

14. The non-transitory machine readable medium of claim 11, wherein substantially no change between the second set of statistical data and the first set of statistical data indicates that objects from the second set of objects have not been relocated to the second geographical location proximal to the known first geographical location.

* * * * *